(12) United States Patent
Westrup et al.

(10) Patent No.: US 12,192,562 B2
(45) Date of Patent: *Jan. 7, 2025

(54) LATENCY COMPENSATION FOR EXTERNAL NETWORKS

(71) Applicant: Userful Corporation, Calgary (CA)

(72) Inventors: Stirling Graham Westrup, Dollard-des-Ormeaux (CA); Reza Razavi, Calgary (CA)

(73) Assignee: Userful Corporation (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,767

(22) Filed: Nov. 6, 2023

(65) Prior Publication Data

US 2024/0073475 A1 Feb. 29, 2024

Related U.S. Application Data

(63) Continuation of application No. 18/099,747, filed on Jan. 20, 2023, now Pat. No. 11,849,172, which is a continuation of application No. 17/843,722, filed on Jun. 17, 2022, now Pat. No. 11,589,104.

(51) Int. Cl.
*H04N 21/43* (2011.01)
*H04N 21/4402* (2011.01)

(52) U.S. Cl.
CPC .......... *H04N 21/43076* (2020.08); *H04N 21/440218* (2013.01)

(58) Field of Classification Search
CPC ..... H04N 21/43076; H04N 21/440218; H04N 21/4307; H04N 21/44
See application file for complete search history.

(56) References Cited

U.S. PATENT DOCUMENTS

| | | | | |
|---|---|---|---|---|
| 7,344,084 B2* | 3/2008 | DaCosta | ............ | H04N 21/4126 348/E7.071 |
| 7,349,359 B2* | 3/2008 | Chang | .................... | H04L 12/66 370/312 |
| 7,406,703 B2* | 7/2008 | Lee | .................... | H04N 21/2362 725/135 |
| 7,457,542 B2* | 11/2008 | Sekine | ............... | H04B 10/2507 398/208 |
| 7,707,303 B2* | 4/2010 | Albers | ................... | H04L 47/283 709/231 |
| 7,712,125 B2* | 5/2010 | Herigstad | .......... | H04N 21/4755 725/38 |
| 7,796,551 B1* | 9/2010 | Machiraju | ............... | H04L 5/003 370/348 |
| 7,818,779 B2* | 10/2010 | Matsuzaki | ......... | H04N 21/2347 725/147 |

(Continued)

*Primary Examiner* — Michael B. Pierorazio

(74) *Attorney, Agent, or Firm* — Van Pelt, Yi & James LLP

(57) ABSTRACT

A request for a latency value associated with the a is received at a latency agent associated with the sink from a processing engine. The latency value associated with the sink is determined. The determined latency value associated with the sink is provided from the latency agent associated with the sink to the processing engine. A latency adjustment value is received at the latency agent associated with a sink from the processing engine. A latency associated with the sink is adjusted by the latency agent associated with the sink to match the received latency adjustment value.

20 Claims, 6 Drawing Sheets

(56) References Cited

U.S. PATENT DOCUMENTS

| | | | | |
|---|---|---|---|---|
| 8,089,911 B2* | 1/2012 | Huang | | H04L 5/14 370/335 |
| 8,305,980 B1* | 11/2012 | Nix | | H04L 65/1083 370/329 |
| 8,356,325 B2* | 1/2013 | Foti | | H04L 65/1094 725/95 |
| 8,412,798 B1* | 4/2013 | Wang | | H04L 67/52 709/217 |
| 2003/0135632 A1* | 7/2003 | Vrzic | | H04W 28/02 709/231 |
| 2004/0025184 A1* | 2/2004 | Hakenberg | | H04L 65/70 375/E7.017 |
| 2004/0226050 A1* | 11/2004 | Matsuzaki | | H04N 21/8547 725/135 |
| 2005/0058090 A1* | 3/2005 | Chang | | H04L 12/66 370/312 |
| 2005/0166135 A1* | 7/2005 | Burke | | H04N 21/23406 370/503 |
| 2005/0216731 A1* | 9/2005 | Saito | | H04N 21/25816 713/153 |
| 2006/0112168 A1* | 5/2006 | Albers | | H04L 1/1848 709/213 |
| 2006/0227796 A1* | 10/2006 | Wei | | H04L 47/2433 370/412 |
| 2006/0280502 A1* | 12/2006 | Sekine | | H04L 12/66 398/71 |
| 2007/0067812 A1* | 3/2007 | Watanabe | | H04N 21/26208 348/E7.071 |
| 2008/0134258 A1* | 6/2008 | Goose | | H04N 21/632 725/91 |
| 2008/0198785 A1* | 8/2008 | Huang | | H04N 21/6131 370/312 |
| 2009/0247211 A1* | 10/2009 | Kuroda | | H04W 74/002 455/522 |
| 2010/0100917 A1* | 4/2010 | Chiao | | H04N 21/43076 725/110 |
| 2010/0121941 A1* | 5/2010 | Harrang | | G06F 16/24 709/219 |
| 2010/0138561 A1* | 6/2010 | Church | | H04W 52/58 709/248 |
| 2010/0205642 A1* | 8/2010 | Foti | | H04L 65/1083 725/109 |
| 2010/0232453 A1* | 9/2010 | Ohashi | | H04N 21/2402 370/468 |
| 2010/0303100 A1* | 12/2010 | Niamut | | H04L 65/80 370/503 |
| 2011/0231553 A1* | 9/2011 | Patel | | H04L 65/1094 709/227 |
| 2012/0002111 A1* | 1/2012 | Sandoval | | H04N 5/06 348/521 |
| 2012/0079541 A1* | 3/2012 | Pan | | H04N 21/4302 725/62 |
| 2012/0093062 A1* | 4/2012 | Perras | | H04L 65/1083 370/315 |
| 2012/0120845 A1* | 5/2012 | Perras | | H04W 8/186 370/254 |
| 2013/0251329 A1* | 9/2013 | McCoy | | H04N 21/44004 386/E5.032 |
| 2014/0029910 A1* | 1/2014 | Maruyama | | H04N 21/43074 386/220 |
| 2015/0301788 A1* | 10/2015 | Johnston | | H04N 21/4112 700/94 |
| 2018/0035164 A1* | 2/2018 | Sizemore | | H04N 21/4263 |

* cited by examiner

LATENCY COMPENSATION FOR EXTERNAL NETWORKS

CROSS REFERENCE TO OTHER APPLICATIONS

This application is a continuation of U.S. patent application Ser. No. 18/099,747 entitled LATENCY COMPENSATION FOR EXTERNAL NETWORKS filed Jan. 20, 2023, which is a continuation of U.S. patent application Ser. No. 17/843,722, now U.S. Pat. No. 11,589,104, entitled LATENCY COMPENSATION FOR EXTERNAL NETWORKS filed Jun. 17, 2022, each of which is incorporated herein by reference for all purposes.

BACKGROUND OF THE INVENTION

A mixer may be connected to one or more sources and one or more sinks. When the mixer is outputting a stream of data (e.g., video, audio, etc.) to a plurality of sinks (e.g., an array of displays) and a new source and/or a new sink is connected to the mixer, the new source and/or new sink introduces latencies that prevents the data outputted by the plurality of sinks from being synchronized.

For example, a mixer may be connected to a first source that is provided to a first sink. A second sink may be connected to the mixer while the mixer is outputting data to the first sink and introducing latencies such that an output of the first sink is out of sync with an output of the second sink. The output of the first sink may be outputted before the output of the second sink or the output of the first sink may be outputted after the output of the second sink.

Other systems may pause an output of one of the sinks to enable the sink outputs to become synchronized. Pausing an output of one of the sinks may cause a black screen to appear for that sink until the output is resumed. The mixer may be connected to many sinks that are out-of-sync. Such a solution is undesirable for enterprise applications because displaying a black screen to a consumer may indicate a problem or glitch with the system when no such problem or glitch exists.

BRIEF DESCRIPTION OF THE DRAWINGS

Various embodiments of the invention are disclosed in the following detailed description and the accompanying drawings.

DETAILED DESCRIPTION

Figure 1:
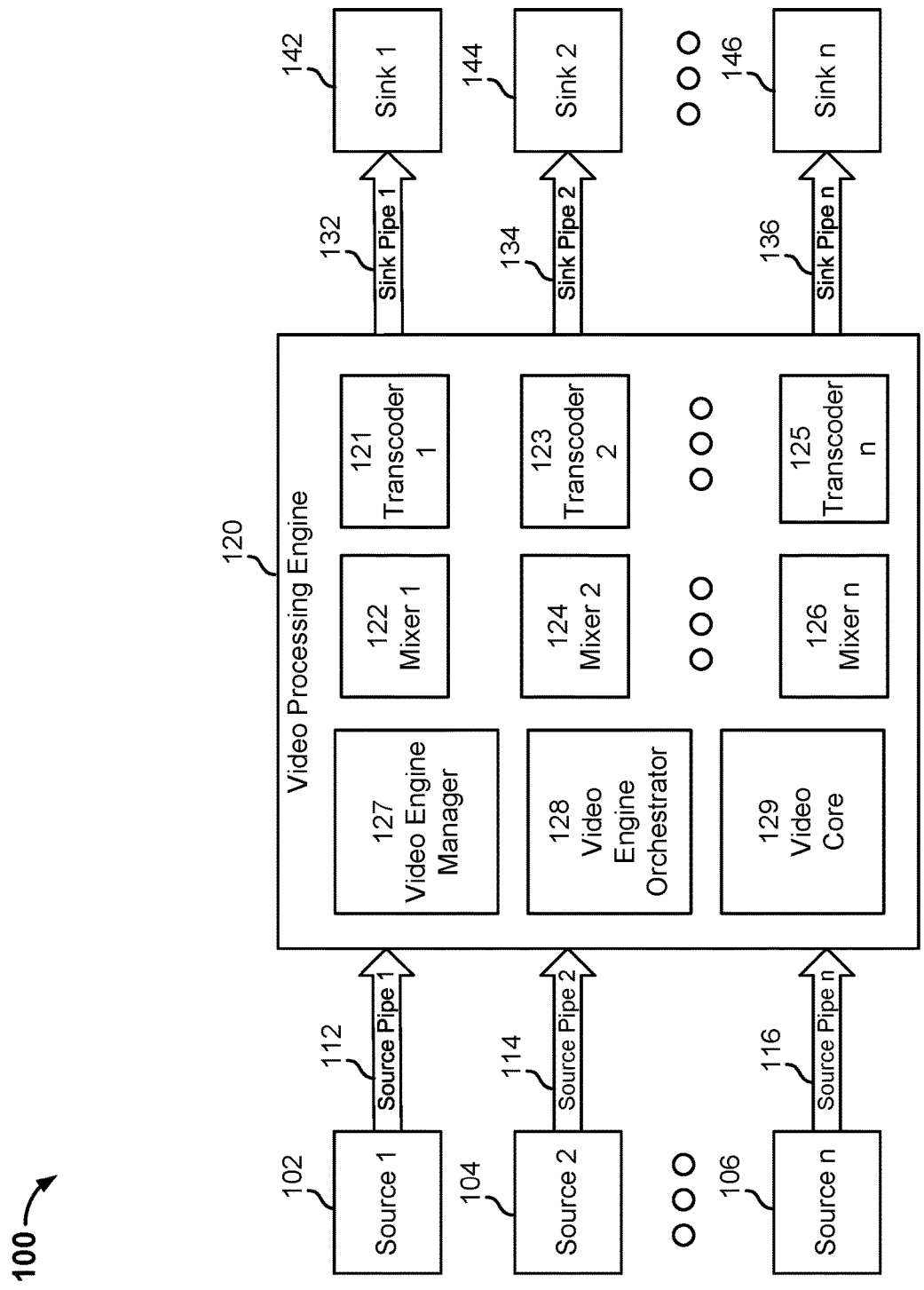
FIG. 1 is a block diagram illustrating a system for synchronizing sinks having different latencies in accordance with some embodiments.

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to synchronize sinks having different latencies are disclosed herein. The disclosed techniques enable sinks to be synchronized without having to pause the output displayed by any of the sinks. A video processing engine receives input data (e.g., video feed, audio feed, static image, visual effects, etc.) from a plurality of sources. The video processing engine mixes the input data, transcodes the mixed input data into a corresponding format associated with a plurality of sinks, and outputs the data to the plurality of sinks (e.g., local display, remote display, etc.) via a plurality of networks. In some embodiments, a sink is located in an internal network that includes the video processing engine. In some embodiments, a sink is located in an external network remote from the video processing engine.

There is a particular amount of latency from the point in time at which the video processing engine receives the input data from a source to the point in time at which the data is displayed by a sink. The latency associated with each of the plurality of sinks may be different. For example, there may be a first amount of latency associated with a first sink, a second amount of latency associated with a second sink, . . . , and an nth amount of latency associated with an nth sink. As a result, the transcoded data may be displayed by the plurality of sinks at different points in time.

The video processing engine determines a latency adjustment value that enables the plurality of sinks to synchronously display the data. The video processing engine determines the latency adjustment value in part by transmitting the data to the plurality of sinks and providing to each of the plurality of sinks a corresponding request for a latency value associated with displaying the data transmitted from the video processing engine. The data transmitted from the video processing engine is comprised of a plurality of frames. A sink may determine the latency value associated with displaying the first frame of the plurality of frames and provide the determined latency value to the video processing engine. The determined latency value associated with the first frame is the amount of time between a point in time at which the video processing engine transmits the first frame to a point in time at which the sink displays the first frame.

In response to receiving the corresponding latency value from each of the plurality of sinks, the video processing engine determines a maximum latency value. The maximum latency value is the latency adjustment value to which an output of the plurality of sinks needs to be adjusted. For example, a first sink may have a corresponding latency value of 40 milliseconds (ms), a second sink may have a corresponding latency value of 200 ms, and a third sink may have a corresponding latency value of 400 ms. In this example, the latency adjustment value is 400 ms.

The video processing engine provides to each of the plurality of sinks a request to adjust their corresponding latency value to the latency adjustment value. In response to receiving the request, each of the plurality of sinks adjusts their corresponding latency value to become the latency adjustment value. For example, the first sink adjusts its latency value from 40 ms to 400 ms, the second sink adjusts its latency value from 200 ms to 400 ms, and the third sink does not adjust its latency value since its latency value is already 400 ms. In some embodiments, a sink adjusts its latency value by increasing the amount of time between frames of the data transmitted from the video processing engine until the latency value associated with the sink is equal to the latency adjustment value. The amount of time between frames may be increased at a constant rate, a linear rate, or a non-linear rate. In some embodiments, the request provided by the video processing engine includes a threshold period of time (e.g., 10 seconds) in which a latency value of a sink needs to match the latency adjustment value. Providing a latency adjustment value and enabling each of a plurality of sinks to adjust their corresponding latency values to match the latency adjustment value enables the output of the plurality of sinks to become synchronized without having to pause any of the sinks. Adjusting the latency values in such a manner may be imperceptible or nearly imperceptible to the human eye (e.g., a video is displayed at 90% speed for five seconds.).

In some embodiments, the video processing engine is connected to a sink via a chain of external networks, i.e., a sink pipe. Each external network has a corresponding latency value. Each external network is unaware that it is part of the sink pipe. As a result, providing a latency adjustment value to the first external network of the sink pipe does not necessarily guarantee that the video processing engine output will be displayed by the sink associated with the sink pipe with a latency value that is equal to the latency adjustment value. A corresponding latency agent may be inserted into each of the external networks. A latency agent is configured to provide the video processing engine via an out-of-band network a corresponding latency value associated with the external network to which the latency agent is associated. Such a latency agent may adjust the latency of data passing through the network and may track the state of its attached network so as to be able to give accurate latency readings by compensating for any behavioral peculiarities of the external network which cannot be directly controlled.

In response to receiving the latency values associated with each of the external networks, the video processing engine is configured to determine an overall latency value for the sink pipe by summing the received latency values associated with each of the external networks. In some embodiments, the overall latency value for the sink pipe is the maximum latency value associated with a plurality of sinks. In some embodiments, the video processing engine provides to each of the plurality of latency agents included in a sink pipe a request to adjust the corresponding latency value to be a corresponding agent latency adjustment value. For example, the latency adjustment value may be 400 ms, a first external network may have a latency value of 40 ms, a second external network may have a latency value of 200 ms, and a third external network may have a latency value of 100 ms. The sum of the latencies of the external network comprising the sink pipe would thus be 340 ms. As the latency adjustment value is 400 ms, there is a need for an additional 60 ms of latency. The latency agents will be given instructions so as to adjust latency by an additional amount which sums to the 60 ms for the sink pipe. This added latency may be divided between the external latency agents in any number of ways depending on the circumstance. For example, the first latency agent may be asked to adjust the latency by 45 ms, while the second latency agent is asked to adjust latency by 10 ms, and the third latency agent is asked to adjust latency by 5 ms. Upon receiving these adjustment values, the latency agents will adjust their associated networks so that the first external network has a latency of 85 ms, the second external network has a latency of 210 ms and the third external network has a latency of 105 ms. Data produced by the video processing engine will traverse this chain in order, with each external network contributing its own latency such that the final latency will be the sum of the latencies of the networks. This latency sum of 85 ms, 410 ms, and 205 ms is 400 ms, which is the required overall latency adjustment value.

For clarity of explanation, the previous example treats a sink pipe as a complete and separable embodiment, which in many cases it may be. But with no loss of generality, a sink pipe may also be an embodiment of a logical path through a connected series of external networks and their associated latency agents such that any given external network or latency agent may participate in multiple distinct sink pipes and any two sink pipes may end up sharing a latency agent or external network, or both.

FIG. 1 is a block diagram illustrating a system for synchronizing sinks having different latencies in accordance with some embodiments. In the example shown, system 100 includes source 102, source 104, . . . , and source 106. Although three sources are shown, system 100 may include 1:n sources. A source may be a video input, an audio input, an image input, a textual input, a haptic input, a visual effect input, a remote desktop session, a browser session, a desktop application, a mobile device application, an external network, etc. Sources 102, 104, 106 are coupled to video processing engine 120 via source pipes 112, 114, 116, respectively. A source pipe may include a wired connection or wireless connection. The source pipe may include an internal network and/or an external network.

Video processing engine 120 may be comprised of one or more graphical processing units. Video processing engine 120 may be connected to 1:n sources and 1:n sinks. Video processing engine 120 includes transcoder 121, transcoder 123, . . . , and transcoder 125. Although three transcoders are shown, video processing engine 120 may include 1:n transcoders. Video processing engine 120 includes mixer 122, mixer 124, . . . , and mixer 126. Although three mixers are shown, video processing engine 120 may include 1:n mixers. Video processing engine 120 is capable of connecting any combination of sources 102, 104, . . . , 106 to a mixer to mix the input data associated with the sources, using a transcoder to transcode the mixed input data into a corresponding format associated with any of the sinks 142, 144, ..., 146, and outputting the transcoded data to any combination of sinks 142, 144, ..., 146. A sink may be a recording device, a video display system, an array of video display systems, an image display, an array of image displays, an audio speaker, a force-feedback device, a vibrational signaler, a haptic output, a textual teleprompter, a computer terminal display, a mobile device display, an analytic software routine, etc. Video processing engine 120 may utilize a multimedia applications programming interface (API), e.g., GStreamer, to output the transcoded data.

Video processing engine 120 includes video engine manager 127. Video engine manager 127 is configured to manage the creation of operations, update operations, and delete operations for mixer 122, 124, ..., 126, and their associated sink pipes. Video engine orchestrator 128 is configured to receive from video engine manager 127 a configuration recipe that describes the manner in which transcoded data outputted by video processing engine 120 is to be outputted. Video engine orchestrator 128 configures a mixer according to a received configuration recipe. The received configuration recipe may specify a group that includes one or more of the sources 102, 104, ..., 106 and one or more of the sinks 142, 144, ... 146. Video core 129 is configured to control how memory associated with video processing engine 120 is shared between the different pipelines. This enables mixers and pipelines to be added and removed seamlessly without affecting other parts of the system. Video core 129 may isolate pipelines so that errors in a particular source or sink will not affect other pipelines. This results in improved stability for system 100.

Video processing engine 120 is connected to sinks 142, 144, ..., 146 via sink pipes 132, 134, ..., 136, respectively. In some embodiments, a sink is associated with an internal network. In some embodiments, a sink is associated with an internal network and an external network. In some embodiments, a sink is associated with an internal network and a plurality of external networks.

There is a particular amount of latency from the point in time at which the video processing engine 120 receives the input data from a source, such as sources 102, 104, and 106, to the point in time at which the data is displayed by a sink, such as sinks 142, 144, 146. The latency associated with each of the plurality of sinks may be different. For example, there may be a first amount of latency associated with sink 142, a second amount of latency associated with sink 144, ..., and an nth amount of latency associated with sink 146. As a result, the transcoded data outputted by video processing engine 120 may be displayed by the plurality of sinks at different points in time, i.e., out-of-sync.

Video processing engine 120 receives an indication of a group comprising one or more sources and a plurality of sinks. In some embodiments, the group includes all of the sources 102, 104, ..., 106. In some embodiments, the group includes a subset of the sinks 102, 104, ..., 106. In some embodiments, the group includes all of the sinks 142, 144, ..., 146. In some embodiments, the group includes a subset of the sinks 142, 144, ..., 146. Video processing engine 120 mixes the input data associated with the one or more sources included in the group using one of the mixers 122, 124, ..., 126 and transcodes the mixed data into a corresponding format associated with the plurality of sinks included in the group using one of the transcoders 121, 123, ..., 125.

Video processing engine 120 determines a latency adjustment value that enables the plurality of sinks included in the group to synchronously display the transcoded data outputted by video processing engine 120. Video processing engine 120 determines the latency adjustment value in part by transmitting the corresponding transcoded data to the plurality of sinks included in the group and providing to each of the plurality of sinks included in the group a request for a corresponding latency value associated with displaying the corresponding transcoded data transmitted from video processing engine 120. The corresponding transcoded data transmitted from video processing engine 120 is comprised of a plurality of frames. A sink may determine the latency value associated with displaying the first frame of the plurality of frames and provide the determined latency value to video processing engine 120. The determined latency value associated with the first frame is the amount of time between a point in time at which the video processing engine transmits the first frame to a point in time at which the sink displays the first frame.

In response to receiving the corresponding latency value from each of the plurality of sinks included in the group, video processing engine 120 determines a maximum latency value. The maximum latency value is the latency adjustment value to which the plurality of sinks included in the group need to adjust their corresponding latency value.

Video processing engine 120 provides to each of the plurality of sinks included in the group a request to adjust their corresponding latency value to the latency adjustment value. In response to receiving the request, each of the plurality of sinks included in the group adjusts their corresponding latency value to become the latency adjustment value. In some embodiments, a sink included in the group adjusts its latency value by increasing an amount of time between frames of the data transmitted from video processing engine 120 until the latency value associated with the sink is equal to the latency adjustment value. The amount of time between frames may be increased at a constant rate, a linear rate, or a non-linear rate. In some embodiments, the request provided by video processing engine 120 includes a threshold period of time (e.g., 10 seconds) in which the latency value associated with a sink included in the group needs to be adjusted to match the latency adjustment value.

In some embodiments, a sink pipe, such as sink pipe 132, 134, ..., 136 is comprised of a chain of external networks. Each external network has a corresponding latency value. Each external network is unaware that it is part of the sink pipe. As a result, providing a latency adjustment value to the first external network of the sink pipe does not necessarily guarantee that the video processing engine 120 output will be displayed at the sink associated with the sink pipe with a latency value that is equal to the latency adjustment value. A corresponding latency agent may be inserted into each of the external networks. A latency agent is configured to provide video processing engine 120 via an out-of-band network with a corresponding latency value associated with the external network to which the latency agent is associated.

In response to receiving the latency values associated with each of the external networks, video processing engine 120 is configured to determine an overall latency value for the sink pipe by summing the received latency values associated with each of the external networks. In some embodiments, the overall latency value for the sink pipe is the maximum latency value associated with a plurality of sinks. In some embodiments, video processing engine 120 provides to each of the plurality of latency agents included in a sink pipe a request to adjust the corresponding latency value associated with an external network to which the latency agent is associated to be a corresponding agent latency adjustment value. For example, transcoded data is provided from video processing engine 120 to a first external network. The first external network introduces latencies to the transcoded data. A first latency agent may adjust a latency associated with the transcoded data to be the corresponding agent latency adjustment value. The transcoded data adjusted by the first latency agent is provided from the first external network to the second external network. The second external network introduces latencies to the transcoded data adjusted by the first latency agent. The second latency agent may adjust the latency value associated with the second external network to be the agent latency adjustment value provided by video processing engine 120. The transcoded data adjusted by the first and second latency agents is then provided from the second external network to the third external network. The third external network introduces latencies to the transcoded data adjusted by the first and second latency agents. The third latency agent may adjust the latency value associated with the third external network to be the agent latency adjustment value provided by video processing engine 120. In some embodiments, the corresponding agent latency adjustment value provided to each of the latency agents is the same. In some embodiments, at least one of the corresponding agent latency adjustment values is different from the one or more other corresponding agent latency adjustment values provided to one or more other latency agents.

In some embodiments, a new source and/or a new sink may be connected to video processing engine 120 and included in a group where transcoded data outputted by video processing engine 120 is being displayed by one or more sinks. The addition of the new source and/or the new sink introduces latencies for which video processing engine 120 is configured to adjust. Video processing engine 120 is configured to determine a latency adjustment value based on the addition of the new source and/or new sink.

In some embodiments, a source and/or a sink is removed from video processing engine 120. The removal of a source and/or a sink changes the maximum latency value for which video processing engine 120 is configured to adjust. Video processing engine 120 is configured to determine a latency adjustment value based on the removal of a source and/or a sink.

Figure 2:
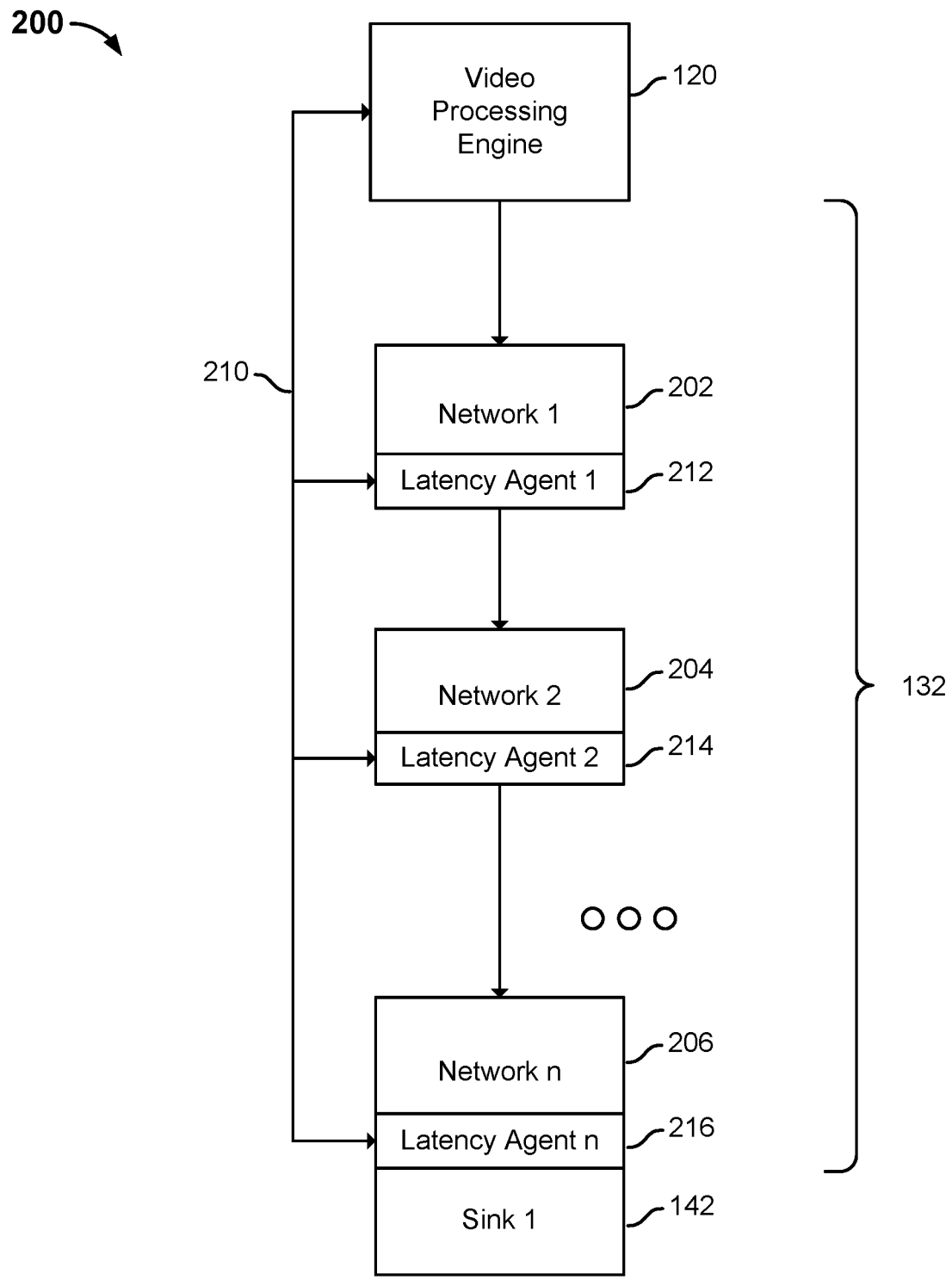
FIG. 2 is a flow diagram illustrating a sink pipe in accordance with some embodiments.

FIG. 2 is a flow diagram illustrating a sink pipe in accordance with some embodiments. In the example shown, video processing engine 120 is connected to sink 142 via sink pipe 132.

Sink pipe 132 includes a chain of external networks 202, 204, ..., 206. An output of video processing engine 120 is provided to the first external network 202. The output of the first external network 202 is provided to a second external network 204. The output of the second external network is provided to a subsequent external network. An output of an n−1 external network is provided to the nth external network 206. Sink 142 is included in the nth external network.

Each external network has a corresponding latency value. Each external network is unaware that it is part of sink pipe 132. As a result, providing a latency adjustment value to the first external network 202 of sink pipe 132 does not necessarily guarantee that the output of video processing engine 120 will be displayed at sink 142 with a latency value that is equal to the latency adjustment value. A corresponding latency agent may be inserted into each of the external networks. In the example shown, latency agent 212 is inserted into network 202, latency agent 214 is inserted into network 204, and latency agent 216 is inserted into network 206.

A latency agent is configured to provide video processing engine 120 via an out-of-band network 210 a corresponding latency value associated with the external network to which the latency agent is associated. In response to receiving the latency values associated with each of the external networks, video processing engine 120 is configured to determine an overall latency value for sink pipe 132 by summing the received latency values associated with each of the external networks. In some embodiments, the overall latency value for sink pipe 132 is the maximum latency value associated with a plurality of sinks included in a group. In some embodiments, the maximum latency value associated with the plurality of sinks included in the group is a latency value associated with a different sink included in the group.

In some embodiments, video processing engine 120 provides to each of the plurality of latency agents 212, 214, 216 included in sink pipe 132 a request to adjust the corresponding latency value for the external network to which the latency agent is associated to be a corresponding agent latency adjustment value. In response, latency agents 212, 214, 216 adjust the latency value associated with a corresponding external network to match the corresponding agent latency adjustment value.

Figure 3:
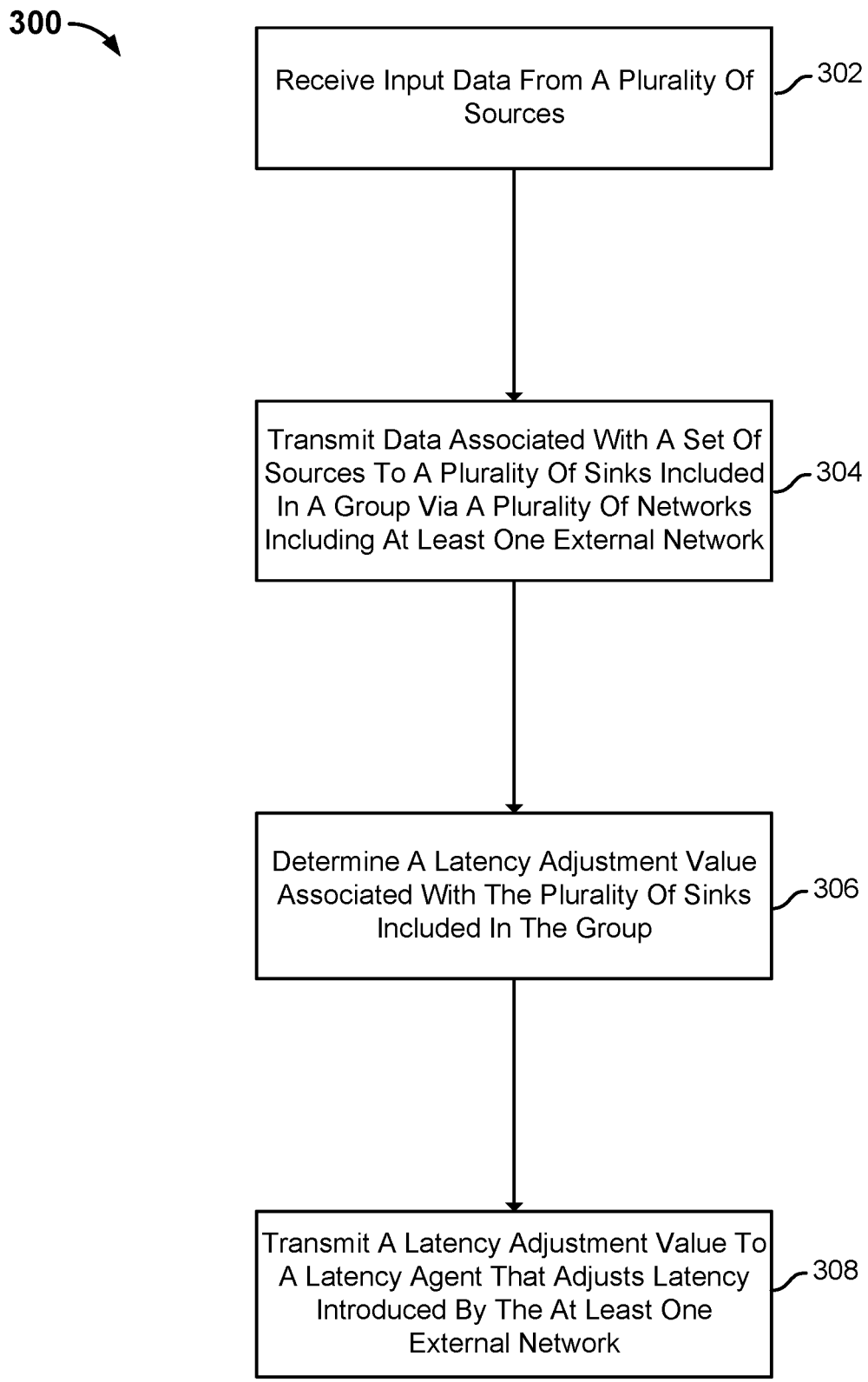
FIG. 3 is a flow diagram illustrating a process of synchronizing sinks having different latencies in accordance with some embodiments.

FIG. 3 is a flow diagram illustrating a process of synchronizing sinks having different latencies in accordance with some embodiments. In some embodiments, process 300 is implemented by a video processing engine, such as video processing engine 120.

At 302, input data is received from a plurality of sources. A mixer is capable of being connected to 1:n sources. The input data associated with a source may include a video feed, an audio feed, a static image, visual effects, a remote desktop session, a browser session, a desktop application, a mobile device application, etc.

At 304, data associated with a set of sources included in a group is transmitted to a plurality of sinks included in the group via a plurality of networks. The group is comprised of one or more sources and a plurality of sinks. The video processing engine mixes the input data, transcodes the mixed input data into a corresponding format associated with a plurality of sinks included in the group, and outputs the data to the plurality of sinks (e.g., local display, remote display, etc.) via a plurality of networks. The plurality of networks includes at least one external network. In some embodiments, a chain of external networks exists between the video processing engine and one of the sinks.

There is a particular amount of latency from the point in time at which the video processing engine receives the input data from a source to the point in time at which the data is displayed by a sink. The latency associated with each of the plurality of sinks may be different.

At 306, a latency adjustment value associated with the plurality of sinks is determined. The transmitted data includes a plurality of frames. A sink may determine the latency value associated with displaying the first frame of the plurality of frames and provide the determined latency value to the mixer. The determined latency value associated with the first frame is the amount of time between a point in time at which the video processing engine transmits the first frame to a point in time at which the sink displays the first frame In some embodiments, an external network separates the video processing engine from the sink. A latency agent that determines a latency value associated with the external network may be inserted into the external network. The latency agent may report such a value to the video processing agent. In some embodiments, the latency agent reports the latency value in response to a request. In some embodiments, the latency agent periodically reports the latency value. In some embodiments, the latency agent reports the latency value in response to detecting a change in the latency value that is more than a threshold amount of change.

At 308, the latency adjustment value is transmitted to a latency agent that adjusts latency introduced by at least one external network. A latency adjustment value may be the maximum of the latency values associated with the plurality of sinks. The latency adjustment value is a relative value to which the latency agent adjusts a corresponding external network's latency value. For example, the latency adjustment value may be 400 ms and the latency value associated with an external network may be 40 ms. The latency agent associated with the external network may adjust the latency value associated with the external network to be the latency adjustment value. For example, the latency agent may increase the amount of time between frames of the data transmitted from the video processing engine until the latency value associated with the external network matches the latency adjustment value.

Figure 4:
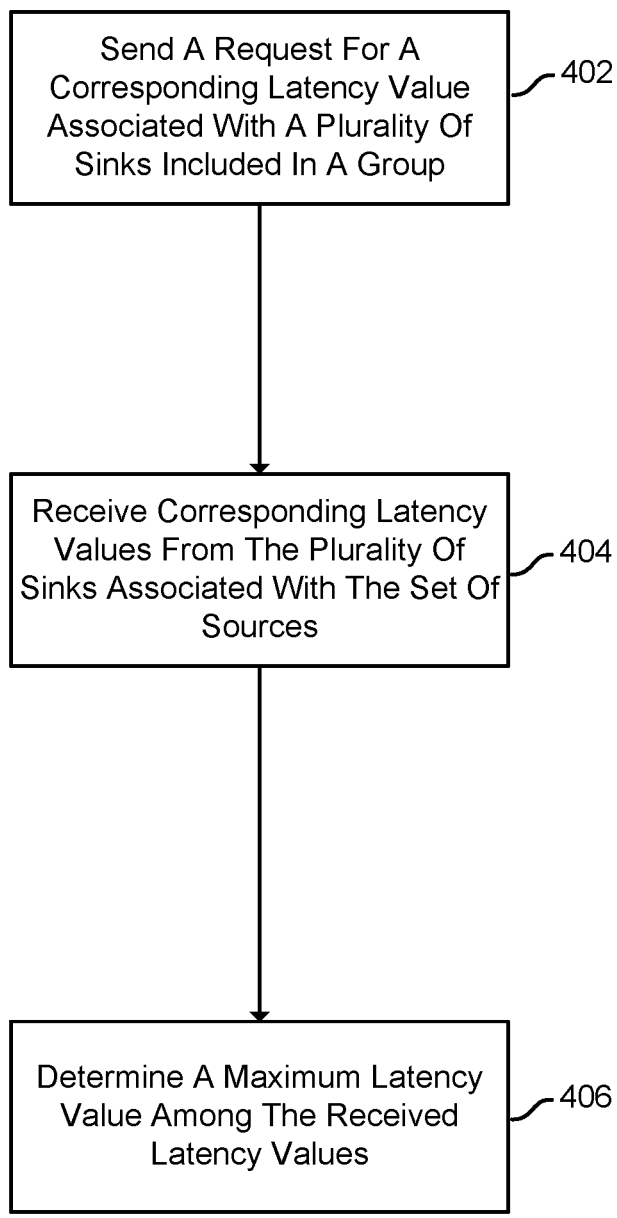
FIG. 4 is a flow diagram illustrating a process of determining a latency adjustment value associated with a plurality of sinks in accordance with some embodiments.

FIG. 4 is a flow diagram illustrating a process of determining a latency adjustment value associated with a plurality of sinks in accordance with some embodiments. In the example shown, process 400 may be implemented by a video processing engine, such as video processing engine 120. In some embodiments, process 400 is implemented to perform some or all of step 306 of process 300.

At 402, a request for a corresponding latency value associated with a plurality of sinks included in a group is sent. A video processing engine is connected to a plurality of sinks (e.g., local display, remote display, display wall, etc.). In some embodiments, some of the plurality of sinks connected to the video processing engine are included in the group. In some embodiments, all of the plurality of sinks connected to the video processing engine are included in the group. The plurality of sinks included in the group are expected to synchronously output data transmitted from the video processing engine. Each of the sinks included in the group has a corresponding latency value.

In some embodiments, a sink is located in an internal network associated with the video processing engine. The request may be directly sent to the sink. In some embodiments, a sink is located in an external network. The request may be sent to a latency agent that is inserted into the external network. In some embodiments, a chain of external networks exists between the mixer and the sink. The request may be sent to a latency agent that is inserted into each of the external networks.

At 404, corresponding latency values are received from the plurality of sinks associated with the set of sources. In some embodiments, a latency value is received from a sink located in an internal network associated with the video processing engine. In some embodiments, a latency value is received from a latency agent associated with an external network included in a sink pipe associated with a sink.

At 406, a maximum value among the received latency values is determined. The maximum value among the received latency values represents a latency adjustment value to which a latency value associated with a sink needs to be adjusted to enable the data transmitted from the video processing engine to be synchronously outputted.

Figure 5:
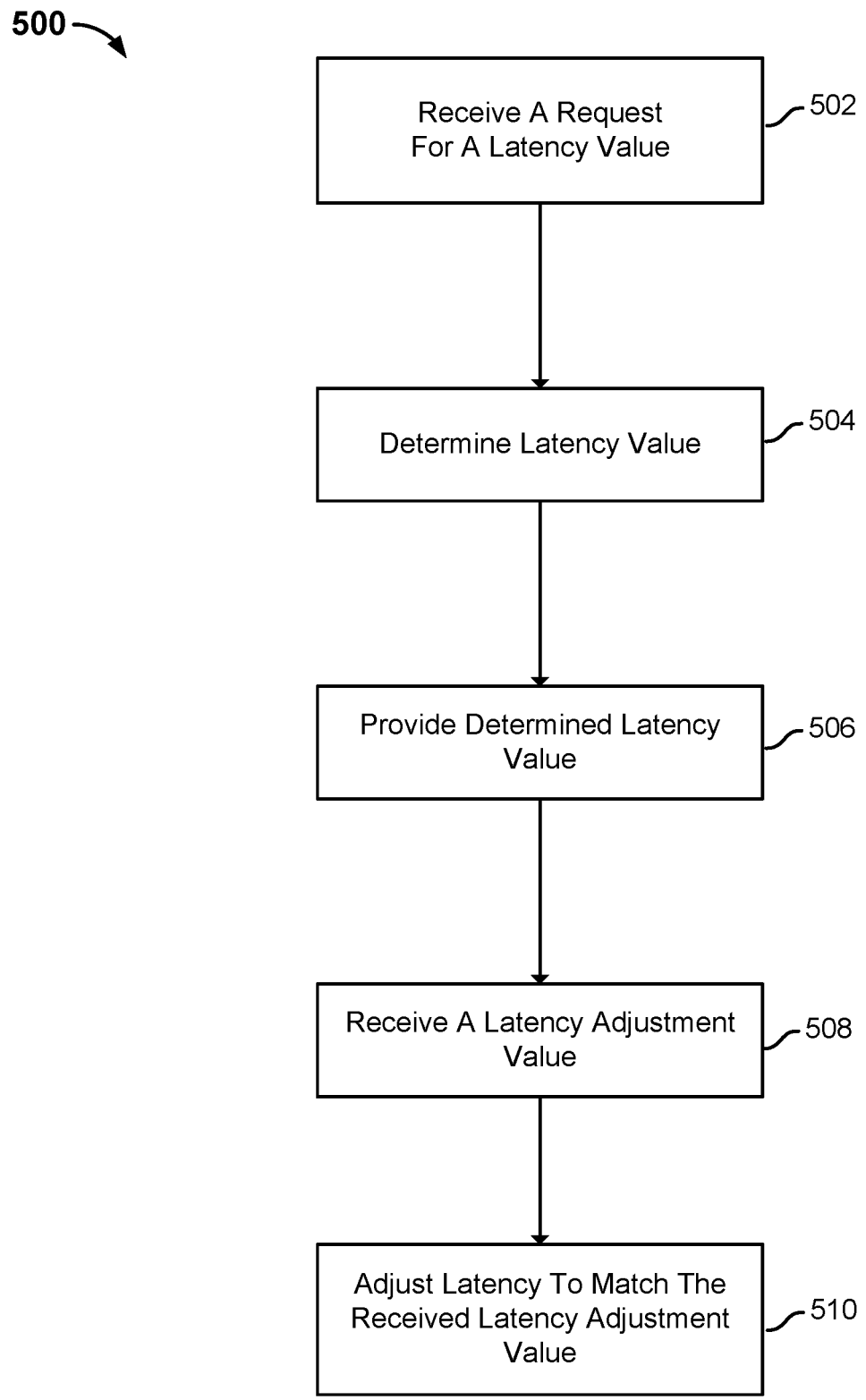
FIG. 5 is a flow diagram illustrating a process of adjusting a latency associated with outputted data in accordance with some embodiments.

FIG. 5 is a flow diagram illustrating a process of adjusting a latency associated with outputted data in accordance with some embodiments. In the example shown, process 500 may be implemented by a sink, such as sinks 142, 144, 146 or a latency agent, such as latency agents 212, 214, 216.

At 502, a request for a latency value is received. The request is received from a video processing engine.

At 504, a latency value is determined. In some embodiments, a sink located in an internal network associated with the video processing engine determines the latency value. In some embodiments, at least one external network separates the video processing engine from the sink. A latency agent is included in each of the at least one external network and determines the latency value.

At 506, the determined latency value is provided.

At 508, a latency adjustment value is received. The video processing engine receives latency values associated with a plurality of sinks. The video processing engine determines a maximum latency value among the received latency values. The maximum latency value is determined to be the latency adjustment value.

At 510, the latency value is adjusted to match the received latency adjustment value.

Figure 6:
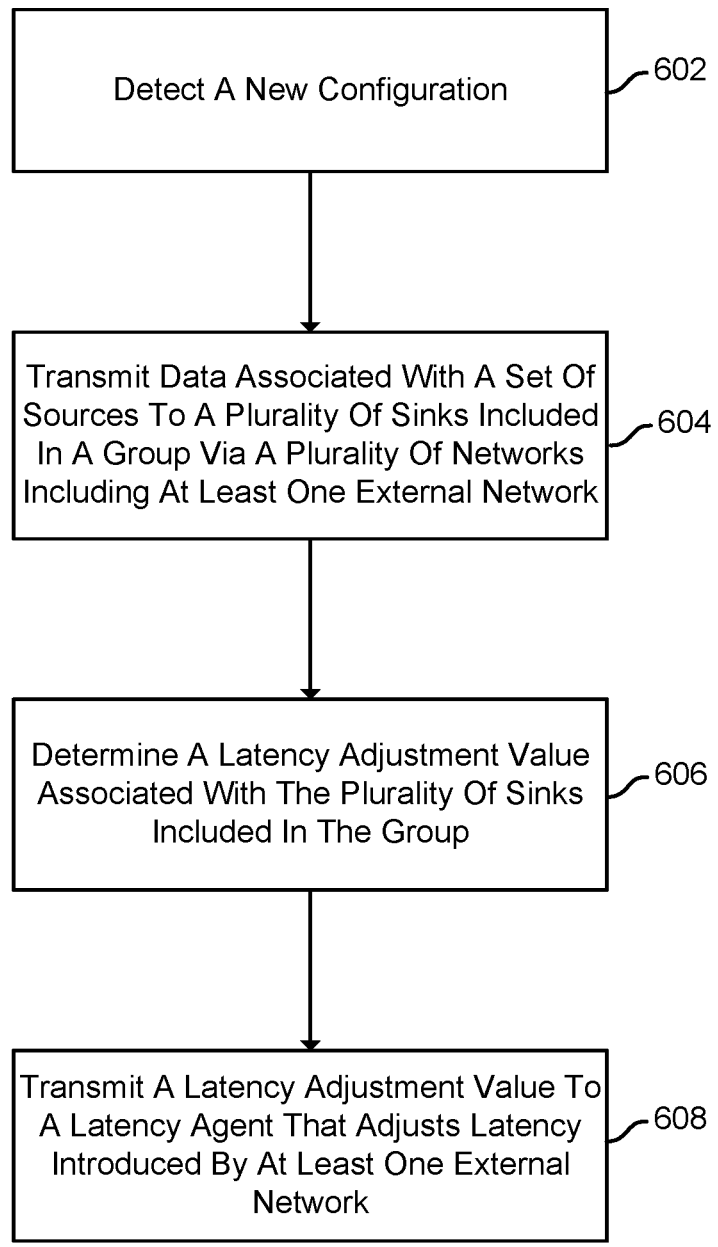
FIG. 6 is a flow diagram illustrating a process of synchronizing sinks having different latencies in accordance with some embodiments.

FIG. 6 is a flow diagram illustrating a process of synchronizing sinks having different latencies in accordance with some embodiments. In the example shown, process 600 may be implemented by a video processing engine, such as video processing engine 120.

At 602, a new configuration is detected. In some embodiments, the new configuration includes one or more sources and/or one or more sinks being added. In some embodiments, the new configuration includes one or more sources and/or one or more sinks being removed. In some embodiments, the new configuration includes one or more sources and/or one or more sinks being added and one or more sources and/or one or more sinks being removed.

A mixer is connected to one or more existing sources and a plurality of sinks. An output of the plurality of sinks may be outputted in-sync. The addition or removal of one or more sources and/or one or more sinks causes the output of the plurality of sinks to become out-of-sync.

At 604, data associated with a set of sources included in a group is transmitted to a plurality of sinks included in the group via a plurality of networks. The group is comprised of one or more sources and a plurality of sinks. The video processing engine mixes the input data, transcodes the mixed input data into a corresponding format associated with a plurality of sinks included in the group, and outputs the data to the plurality of sinks (e.g., local display, remote display, etc.) via a plurality of networks. The plurality of networks includes at least one external network. In some embodiments, a chain of external networks exists between the video processing engine and one of the sinks.

There is a particular amount of latency from the point in time at which the video processing engine receives the input data from a source to the point in time at which the data is displayed by a sink. The latency associated with each of the plurality of sinks may be different.

At 606, a latency adjustment value associated with the plurality of sinks is determined. The transmitted data includes a plurality of frames. A sink may determine the latency value associated with displaying the first frame of the plurality of frames and provide the determined latency value to the mixer. The determined latency value associated with the first frame is the amount of time between a point in time at which the video processing engine transmits the first frame to a point in time at which the sink displays the first frame.

In some embodiments, an external network separates the video processing engine from the sink. A latency agent that determines a latency value associated with the external network may be inserted into the external network. The latency agent may report such a value to the video processing agent. In some embodiments, the latency agent reports the latency value in response to a request. In some embodiments, the latency agent periodically reports the latency value. In some embodiments, the latency agent reports the latency value in response detecting a change in the latency value that is more than a threshold amount of change.

At 608, the latency adjustment value is transmitted to a latency agent that adjusts latency introduced by at least one external network. The latency adjustment value is determined based on the new configuration. A latency adjustment value may be the maximum of the latency values associated with the plurality of sinks. The latency adjustment value is a relative value to which the latency agent adjusts a corresponding external network's latency value. For example, the latency adjustment value may be 400 ms and the latency value associated with an external network may be 40 ms. The latency agent associated with the external network may adjust the latency value associated with the external network to be the latency adjustment value. For example, the latency agent may increase an amount of time between frames of the data transmitted from the video processing engine until the latency value associated with the external network matches the latency adjustment value.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a latency agent associated with a sink from a processing engine, a request for a latency value associated with the sink;
   determining the latency value associated with the sink;
   providing, from the latency agent associated with the sink to the processing engine, the determined latency value associated with the sink;
   receiving, at the latency agent associated with a sink from the processing engine, a latency adjustment value; and
   adjusting, by the latency agent associated with the sink, a latency associated with the sink to match the received latency adjustment value.

2. The method of claim 1, wherein the processing engine is a video processing engine.

3. The method of claim 1, wherein the sink is located in an internal network associated with the processing engine.

4. The method of claim 1, wherein the sink is located in an external network separate from a network in which the processing engine is located.

5. The method of claim 1, wherein in response to receiving the determined latency value associated with the sink, the processing engine determines a maximum latency value among a plurality of corresponding latency values received from a plurality of sinks.

6. The method of claim 5, wherein the latency adjustment value is the determined maximum latency value.

7. The method of claim 1, wherein the determined latency value associated with the sink is provided to the processing engine via an out-of-band network.

8. The method of claim 1, wherein the sink is one of a plurality of sinks included in a chain of external networks.

9. The method of claim 1, wherein the latency agent associated with the sink adjusts the latency associated with the sink to match the received latency adjustment value at a constant rate.

10. The method of claim 1, wherein the latency agent associated with the sink adjusts the latency associated with the sink to match the received latency adjustment value at a linear rate.

11. The method of claim 1, wherein the latency agent associated with the sink adjusts the latency associated with the sink to match the received latency adjustment value at a non-linear rate.

12. The method of claim 1, wherein the latency agent associated with the sink adjusts the latency associated with the sink within a threshold period of time.

13. A system, comprising:
   a processor configured to:
      receive, at a latency agent associated with a sink from a processing engine, a request for a latency value associated with the sink;
      determine the latency value associated with the sink;
      provide, from the latency agent associated with the sink to the processing engine, the determined latency value associated with the sink;
      receive, at the latency agent associated with a sink from the processing engine, a latency adjustment value; and
      adjust, by the latency agent associated with the sink, a latency associated with the sink to match the received latency adjustment value; and
   a memory coupled to the processor and configured to provide the processor with instructions.

14. The system of claim 13, wherein the processing engine is a video processing engine.

15. The system of claim 13, wherein the sink is located in an internal network associated with the processing engine.

16. The system of claim 13, wherein the sink is located in an external network separate from a network in which the processing engine is located.

17. The system of claim 13, wherein in response to receiving the determined latency value associated with the sink, the processing engine determines a maximum latency value among a plurality of corresponding latency values received from a plurality of sinks.

18. The system of claim 17, wherein the latency adjustment value is the determined maximum latency value.

19. The system of claim 13, wherein the sink is one of a plurality of sinks included in a chain of external networks.

20. A computer program product embodied in a non-transitory computer readable medium and comprising computer instructions for:
   receiving, at a latency agent associated with a sink from a processing engine, a request for a latency value associated with the sink;
   determining the latency value associated with the sink;
   providing, from the latency agent associated with the sink to the processing engine, the determined latency value associated with the sink;
   receiving, at the latency agent associated with a sink from the processing engine, a latency adjustment value; and
   adjusting, by the latency agent associated with the sink, a latency associated with the sink to match the received latency adjustment value.

* * * * *